(12) United States Patent
Toyoda

(10) Patent No.: US 7,453,827 B2
(45) Date of Patent: Nov. 18, 2008

(54) IP TELEPHONE AND IP ADAPTOR

(75) Inventor: Kiyoshi Toyoda, Kunitachi (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 735 days.

(21) Appl. No.: 10/936,473

(22) Filed: Sep. 9, 2004

(65) Prior Publication Data

US 2005/0226264 A1  Oct. 13, 2005

(30) Foreign Application Priority Data

Mar. 31, 2004  (JP) ............................. 2004-103927

(51) Int. Cl.
*H04L 12/16* (2006.01)

(52) U.S. Cl. .................. 370/260; 370/352; 370/353; 370/354; 370/355; 370/356; 370/261; 370/262; 370/259; 370/465; 709/201; 709/202; 709/203; 709/204

(58) Field of Classification Search ............ None
See application file for complete search history.

(56) References Cited

U.S. PATENT DOCUMENTS

| | | | |
|---|---|---|---|
| 2002/0165969 A1* | 11/2002 | Gallant ................. | 709/227 |
| 2003/0058805 A1 | 3/2003 | Meyerson et al. | |
| 2003/0058806 A1 | 3/2003 | Meyerson et al. | |
| 2003/0058844 A1 | 3/2003 | Sojka et al. | |
| 2003/0058858 A1 | 3/2003 | Berlyoung et al. | |
| 2003/0059001 A1 | 3/2003 | Meyerson et al. | |
| 2003/0059002 A1 | 3/2003 | Meyerson et al. | |
| 2003/0059003 A1 | 3/2003 | Lewis | |
| 2003/0059005 A1 | 3/2003 | Meyerson et al. | |
| 2003/0059009 A1 | 3/2003 | Meyerson et al. | |
| 2003/0059014 A1 | 3/2003 | Ross et al. | |
| 2003/0059020 A1 | 3/2003 | Meyerson et al. | |
| 2003/0059021 A1 | 3/2003 | Meyerson et al. | |
| 2003/0059022 A1 | 3/2003 | Nebiker et al. | |
| 2003/0059024 A1 | 3/2003 | Meyerson et al. | |

(Continued)

FOREIGN PATENT DOCUMENTS

JP  2003-219027  7/2003

(Continued)

OTHER PUBLICATIONS

English language Abstract of JP 2003-219027.

*Primary Examiner*—Chi H Pham
*Assistant Examiner*—Raj K Jain
(74) *Attorney, Agent, or Firm*—Greenblum & Bernstein, P.L.C.

(57) ABSTRACT

When one of two IP telephones that are maintaining a call receives a TV camera connection request, the IP telephone obtains a URI of an IP TV camera service from a resource record of the opposing terminal. Then, the IP telephone delivers the URI of the IP TV camera service to an IP TV camera adaptor of its own IP telephone in order to make a video communication request. The resource record of the opposing terminal is associated with a telephone number of the opposing IP telephone, the record being obtained by connecting to a DNS server. The IP TV camera adaptor connects a call, via the IP telephone, to an IP TV camera adaptor of the opposing terminal, using the URI of the IP TV camera service of the opposing terminal and performs video image communication.

7 Claims, 7 Drawing Sheets

U.S. PATENT DOCUMENTS

| | | |
|---|---|---|
| 2003/0059025 A1 | 3/2003 | Meyerson et al. |
| 2003/0059033 A1 | 3/2003 | Wall et al. |
| 2003/0059035 A1 | 3/2003 | Nebiker et al. |
| 2003/0059038 A1 | 3/2003 | Meyerson et al. |
| 2003/0059039 A1 | 3/2003 | Meyerson et al. |
| 2003/0061622 A1 | 3/2003 | Nebiker et al. |
| 2003/0137959 A1 | 7/2003 | Nebiker et al. |
| 2003/0214573 A1 | 11/2003 | Oh |
| 2004/0004942 A1 | 1/2004 | Nebiker et al. |
| 2004/0015574 A1 | 1/2004 | Meyerson |
| 2004/0030783 A1 | 2/2004 | Hwang |
| 2004/0062264 A1 | 4/2004 | Adams |
| 2004/0068574 A1 * | 4/2004 | Costa Requena et al. .... 709/230 |
| 2004/0068648 A1 | 4/2004 | Lewis et al. |
| 2004/0076157 A1 | 4/2004 | Sojka et al. |
| 2004/0114577 A1 | 6/2004 | Sojka et al. |
| 2004/0190518 A1 | 9/2004 | Miyajima |
| 2004/0190711 A1 | 9/2004 | Miyajima |
| 2005/0198096 A1 * | 9/2005 | Shaffer et al. ............... 709/200 |

FOREIGN PATENT DOCUMENTS

| | | |
|---|---|---|
| WO | 00/67452 | 11/2000 |
| WO | 01/37139 | 5/2001 |

\* cited by examiner

$ORIGIN <telephone number converted into a domain form>
                                    |
                                    30

IN NAPTR <Priority number1><Priority number2>"u""E2U+<type>:<subtype>" "!^.* $!<URI Scheme>:<URI>!"
   |     |          |               |             |    |       |         |    |       |        |
   31    32         33              34            35   36      37        38   39      40

Fig.4

```
$ORIGIN 8.7.6.5.4.3.4.5.3.1.8.e164.arpa
    IN NAPTR 10 100 "u" "E2U+sip"          "!^.*$!sip:iptel@ifax2.abc.com!
    IN NAPTR 10 101 "u" "E2U+ifax;mailto"    !^.*$!mailto:toyo@abc.com!"
    IN NAPTR 10 102 "u" "E2U+http"           !^.*$!http:pfile@ifax2.abc.com!"
    IN NAPTR 10 103 "u" "E2U+sip"            !^.*$!sipipTVcamera@ipTVcamera.abc.com!"
```

IP TELEPHONE AND IP ADAPTOR

BACKGROUND OF THE INVENTION

1. Field of the Invention

The present invention relates to an IP telephone and an IP telephone call method that enable a voice call over the Internet.

2. Description of Related Art

In recent years, various forms of IP telephone services that employ the VoIP (Voice over Internet Protocol) technology are provided (e.g., Related Art 1). As an example of the IP telephone services, an SIP server on an IP network connects a call, according to the SIP (Session Initiation Protocol), between an IP telephone at a caller terminal and an IP telephone at a receiver terminal. After the call is connected, the IP telephones exchange voice packets via the IP network, in order to realize the real-time telephone call.

In addition, IP TV telephones that can transmit image data together with voice data are being developed. For example, an integrated IP TV telephone, which is equipped with components such as a display, camera, IP telephone, and codec, has been introduced. Another type of IP TV telephone is a set-top box type IP telephone that includes a camera, microphone, and codec, the telephone functioning as an IP TV telephone by connecting to a TV.

[Related Art 1] Japanese Patent Laid-open Application 2003-219027

However, an IP telephone not having such a TV telephone function cannot transmit image data, along with voice data, to an opposing party. Therefore, it is impossible for both parties to exchange video images generated at its own side, so that the video images are displayed on a TV at the opposing party.

SUMMARY OF THE INVENTION

The present invention addresses the above-described problem. The purpose of the invention is to provide an IP telephone, IP adaptor, and IP telephone system that enable an IP telephone not having a TV telephone function to transmit a video image to a display apparatus of an opposing terminal in real-time, the video image being generated by a camera apparatus of the transmitting terminal, and to display received video image transmitted from an opposing party using a display apparatus at its own terminal in real-time.

In the present invention, when one of two IP telephones maintaining a call receives a TV camera connection request, the IP telephone obtains a URI of an IP TV camera service from a resource record of the opposing terminal. Then, the IP telephone delivers the URI of the IP TV camera service to an IP adaptor of its own IP telephone in order to make a request for video communication between IP adaptors of both sides. The resource record of the opposing terminal is associated with a telephone number of the opposing IP telephone, the record being obtained by connecting to a DNS server.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

Embodiments of an IP telephone having an IFAX function according to the present invention are explained in the following, in reference to the above-described drawings.

Figure 1:
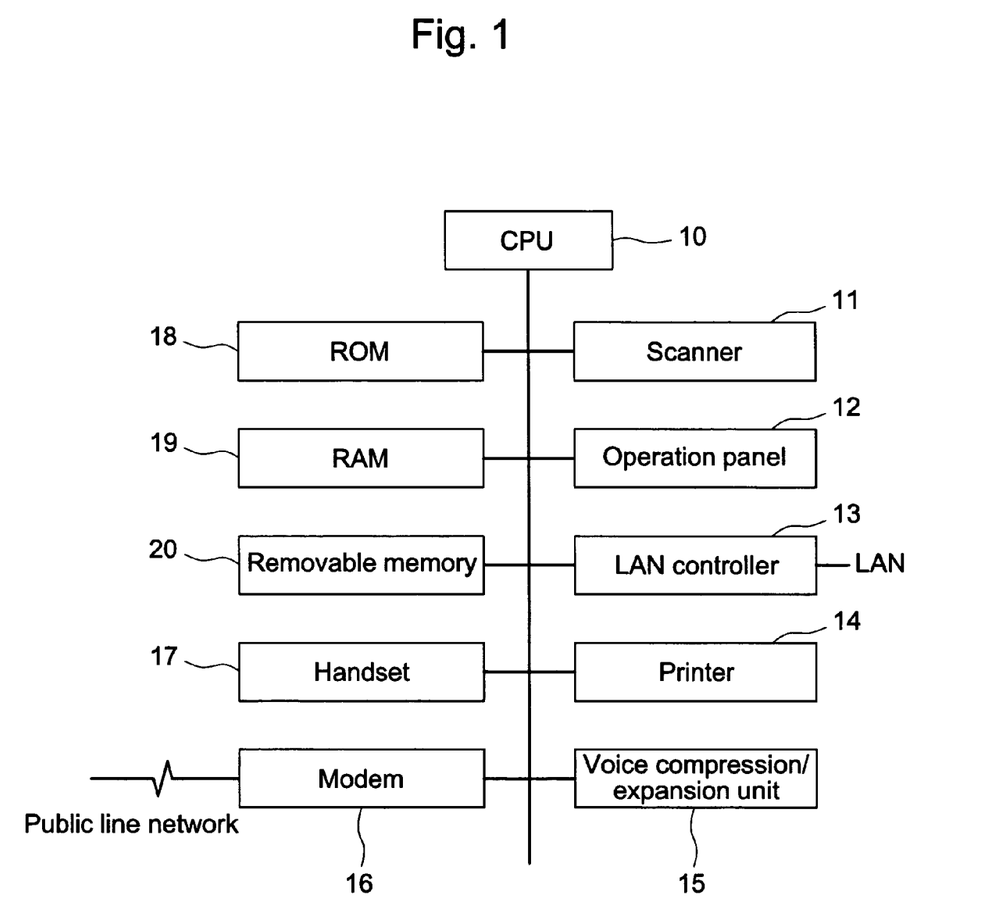
FIG. 1 is a block diagram illustrating an IP telephone according to an embodiment of the present invention.

FIG. 1 is a functional block diagram illustrating the IP telephone according to an embodiment of the present invention. As shown in FIG. 1, the IP telephone has a configuration that enables voice calls via the Internet using the IP telephone function, as well as image communication via the Internet using the IFAX function. The IFAX function does not need to be installed to the IP telephone according to the present invention.

Within the IP telephone, units such as scanner 11, operation panel 12, LAN controller 13, printer 14, voice compression/expansion unit 15, modem 16, and handset 17 are connected to CPU 10 via a bus. In addition, the IP telephone further includes memory media such as ROM 18, RAM 19, and removable memory 20.

Scanner 11 is a unit that scans a document and captures the image in an electronic data format. Operation panel 12 is a unit that includes a display and operation buttons, one of which is a start button that gives a command for starting an operation for IP TV camera communication. The operation button includes another start button that gives a command for starting functions such as scanner function, IFAX function, and copy function. In addition, soft buttons displayed on the display can also function as operation buttons. LAN controller 13 has an interface function that interfaces and exchanges data with the LAN, by physically connected to LAN, according to the LAN protocol. Data being exchanged by the IP telephone via the Internet is transmitted to the Internet or retrieved from the Internet by LAN controller 13. Printer 14 is a unit that prints out printed data, the data being output from a print command of CPU 10. The copy function is performed by capturing an image at scanner 14 and outputting a printout at printer 14. Printer 14 also performs one of IFAX functions, that is, to output a received image as a printout. Voice compression/expansion unit 15 includes a DSP (Digital Signal Compressor) that expands voice data (compressed data) retrieved from LAN controller 13. Modem 16 is a unit that transmits and receives signals to/from the public phone line. Handset 17 includes a speaker and a microphone. The apparatus also includes an off-hook/on-hook detection circuit that detects whether handset 17 is in the off-hook/on-hook status and notifies the detection result to CPU 10 (not shown in the figures). ROM 18 stores application programs for functions of the IP telephone, including the IP telephone function, IFAX function, scanner function, and copy function. In particular, in order to execute each above-described function, CPU 10 executes a command for a program read from ROM 18, and controls the operation of each unit. RAM 19 is a work area for CPU 10 to execute each process. Removal memory 20 includes memory media such as CD, FD(R), etc.

Figure 2:
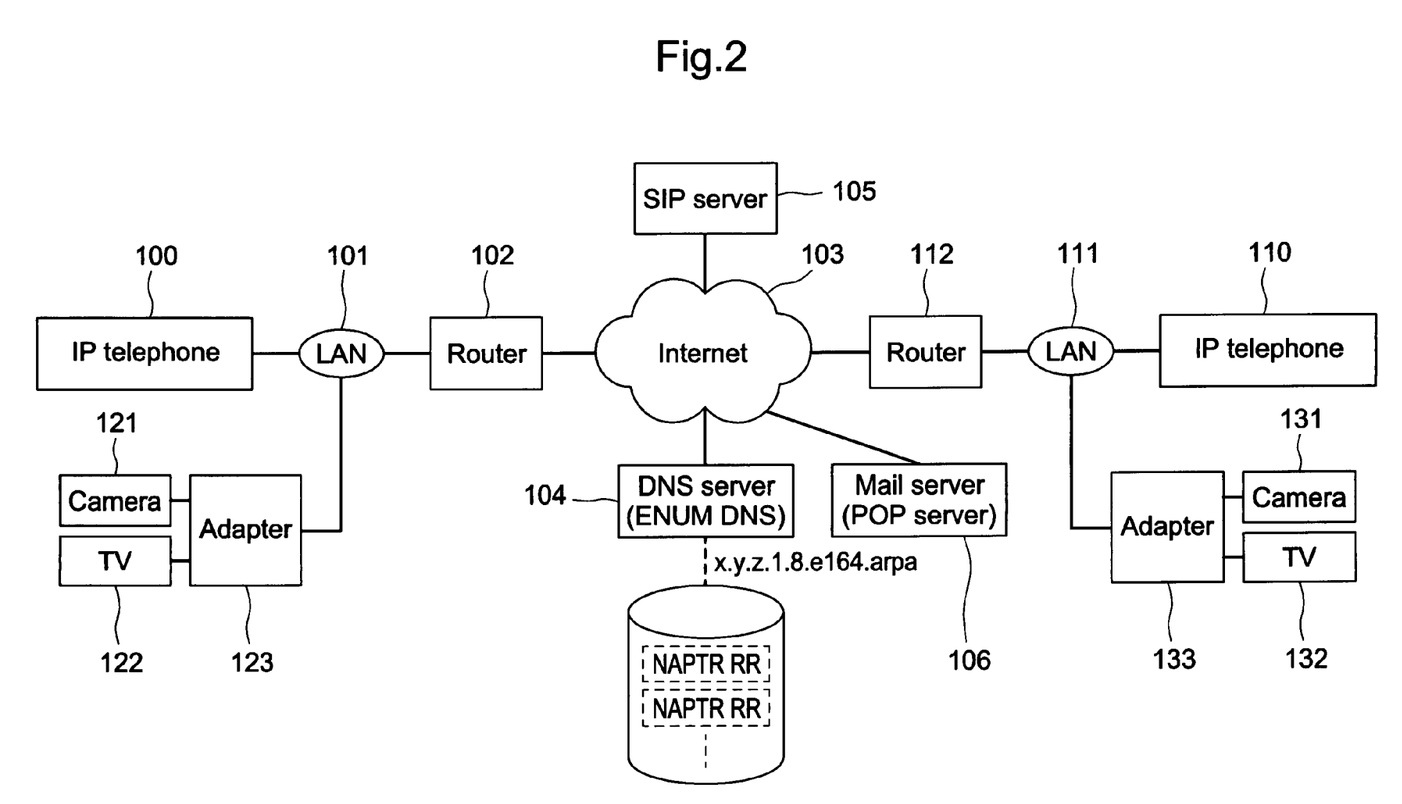
FIG. 2 illustrates a network configuration to which the IP telephone of FIG. 1 is applied.

FIG. 2 illustrates a network configuration to which the IP telephone is applied. IP telephone 100 (110) is connected to LAN 101 (111) to enable an access to Internet 103 via LAN 101 (110) and router 102 (112).

DNS server 104, SIP server 105, and mail server 106 are provided on Internet 103. DNS server 104 functions as an ENUM (Telephone Number Mapping) DNS that employs the ENUM protocol associating a telephone number with a resource on the Internet.

SIP server 105 is a server that assists processes such as establishing a session on the network, according to SIP (Session Initiation Protocol). In this embodiment, SIP server 105 connects a call between the caller terminal and the receiver terminal.

Mail server 106 has a POP server configuration. For example, mail server 106 includes a mailbox of IP telephone 110 that receives, via the Internet, e-mail having the e-mail address of IP telephone 110 in the "to" field, and stores the e-mail. Upon receiving a reception request from IP telephone 110, the e-mail stored in the mailbox is downloaded to the IP telephone 110.

The following briefly explains a system in which a telephone number is converted into a URI at DNS server 104.

The ENUM searches for a DNS using a telephone number as a key, based on the E.164 recommendation (international agreement for telephone numbers by ITU-T). The ENUM provides a system in which one or more available applications, corresponding to the E.164 number, are obtained in the URI (Uniform Resource Identifier) format.

ENUM DNS stores data for each telephone number that is converted and attached to a domain (hereafter referred to as domain-form telephone number). Data is stored as a type of a resource record (RR) called NAPTR (Naming Authority Pointer) (hereafter referred to as NAPTR resource record).

One or more NAPTR resource records can be registered for a domain-form telephone number. Therefore, when searching for an ENUM DNS using the domain-form telephone number, it is possible to receive a plurality of NAPTR resource records.

Figure 3:
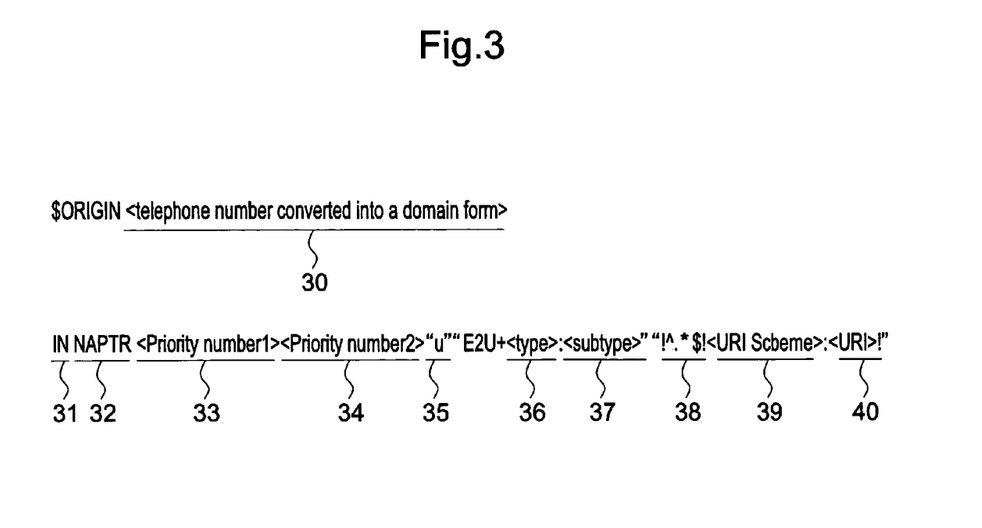
FIG. 3 illustrates a configuration of a converted telephone number to which a domain is attached.

FIG. 3 illustrates a configuration of the NAPTR resource record. In the figure, a telephone number of the terminal is converted into a domain-form number (30) according to a predetermined rule. In particular, the telephone number is reversed in order, and dots "." are inserted after each numeral. At the end of the reversed number, "e164.arpa", which is a domain name of ENUM DNS (104), is added. In the next line of the domain-form telephone number (30), class (31), resource record type (32), priority degree among NAPTR resource records (33, 34), flag (35), service contents (36, 37), substitute character string (38), URI scheme (39), and URI (40). URI (40) illustrates address information in case the terminal having the telephone number (30) uses the service described in the service contents (36, 37). In other words, the NAPTR resource record can specify the kind of service by the service contents (36, 37), and URI (40) can specify the address when the service is used. ENUM DNS (104) can register a plurality of NAPTR resource records in association with the domain-form telephone number (30) of its own.

Figure 4:
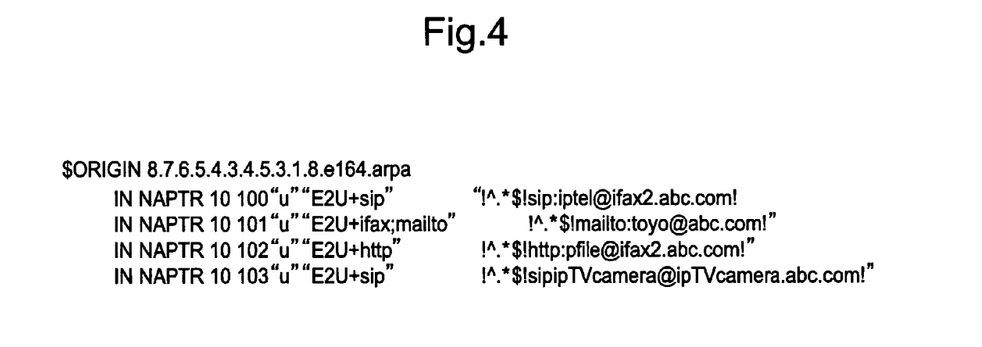
FIG. 4 illustrates an example of an NAPTR resource recode.

FIG. 4 illustrates an example of registering four NAPTR resource records in association with the telephone number "81-03-5434-5678". An IP telephone service is assigned to the first NAPTR resource record, an IFAX service to the second, a file transport service to the third, and an IP TV camera service to the fourth. When the NAPTR resource record of FIG. 4 is provided for the telephone number of IP Telephone 110, URI (40) included in the fourth NAPTR resource record indicates an address of IP TV camera adaptor 133 specified by the user of IP telephone 110.

In this embodiment, camera 121 and TV 122 are provided in an area where IP telephone 100 is located. Camera 121 and TV 122 are connected to LAN 101 (Internet 103) via IP TV camera adaptor 123. Similar configuration is provided in the area where another IP telephone 110 is located. In particular, camera 131 and TV 132 are provided so that they can be connected to LAN 111 (Internet 103) via IP TV camera adaptor 133.

Figure 5:
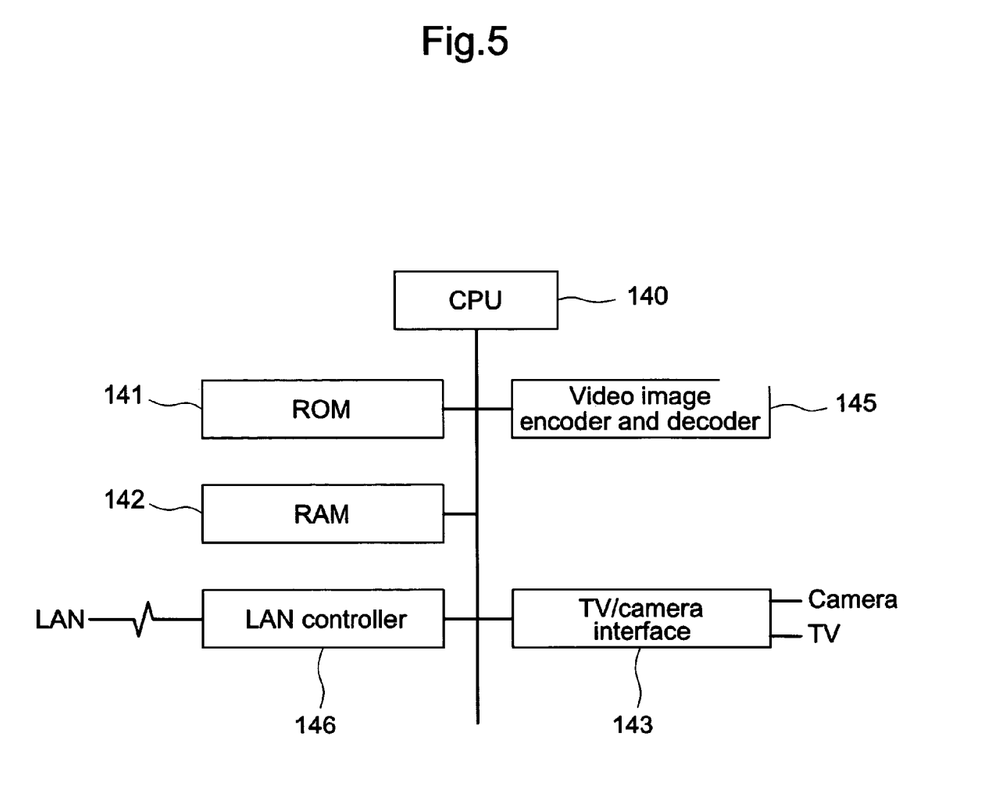
FIG. 5 is a block diagram illustrating an IP TV camera adaptor according to the embodiment of the present invention.

FIG. 5 is a functional block diagram of IP TV camera adaptor 123. ROM 141 RAM 142, TV camera interface 143, video image encoder and decoder 145, LAN controller 146 are connected to CPU 140 via a bus or the like. ROM 141 stores an application program that performs an IP TV camera communication. CPU 140 executes a command described in a program, which is read from ROM 141, and controls on IP TV camera communication (later described). In this example, CPU 140 connects a call to an opposing IP TV camera adaptor 133 according to the SIP. A video output terminal of camera 121 and a video input terminal of TV 122 are physically connected to TV camera interface 143 via a cable or the like. Video image encoder and decoder 145 performs encoding and decoding of a video image. In this example, video image encoder and decoder 145 performs encoding and decoding according to MPEG 4. LAN controller 146 has a function that interfaces with LAN 101, is physically connected to LAN 101, and exchanges data in accordance with the LAN protocol.

In this embodiment, IP telephone 100 and IP telephone 110 have the same configuration. Also, IP TV camera adaptor 123 and the IP TV camera adaptor 133 have the same configuration. Therefore, the same numerical characters are applied to parts having the same configuration.

The following illustrates an operation in which a receiver terminal displays a video image generated at a caller terminal, while maintaining a voice call between both terminals using IP telephones.

Figure 6:
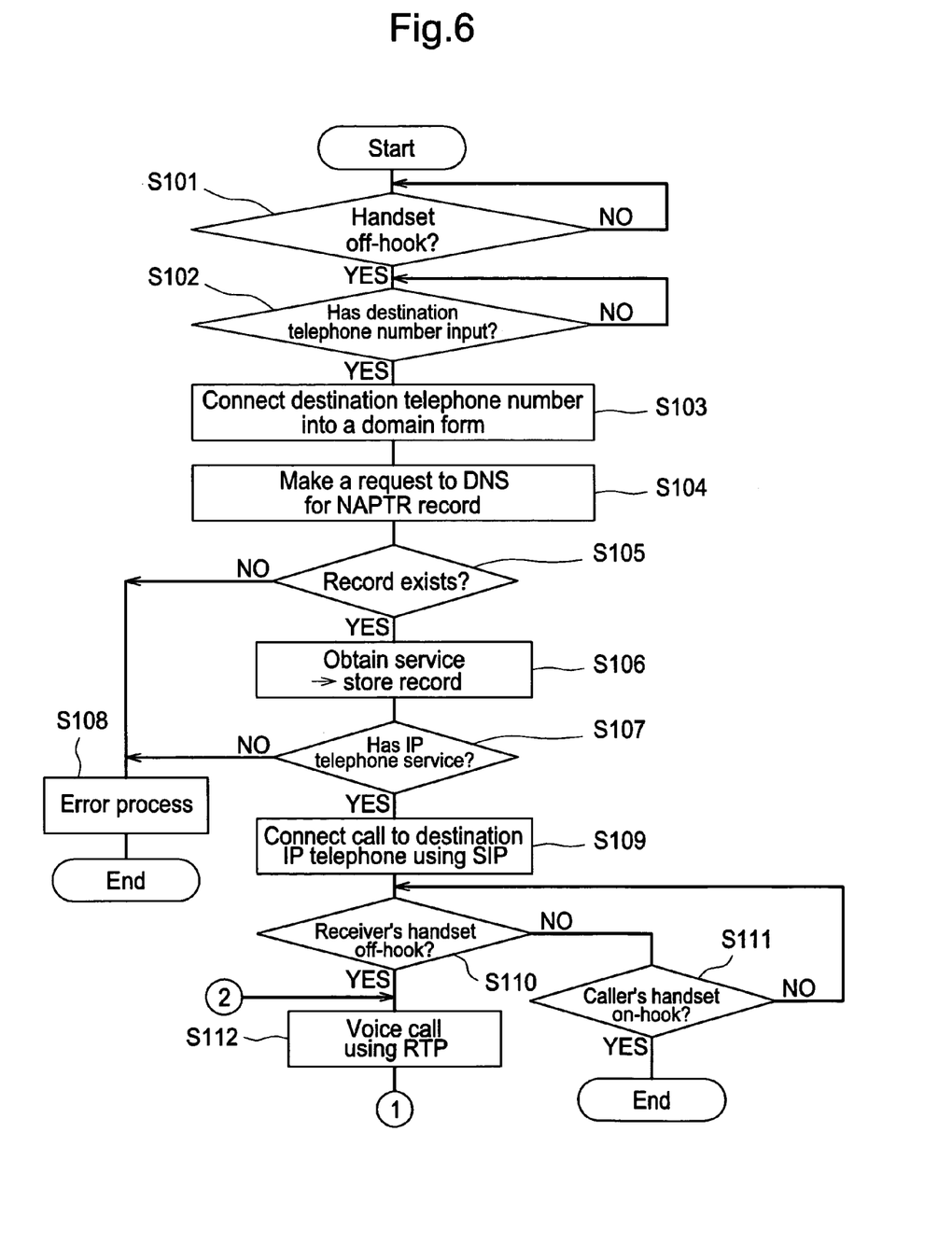
FIG. 6 is a flowchart illustrating the first half of a process for generating and executing a call at a caller terminal.
Figure 7:
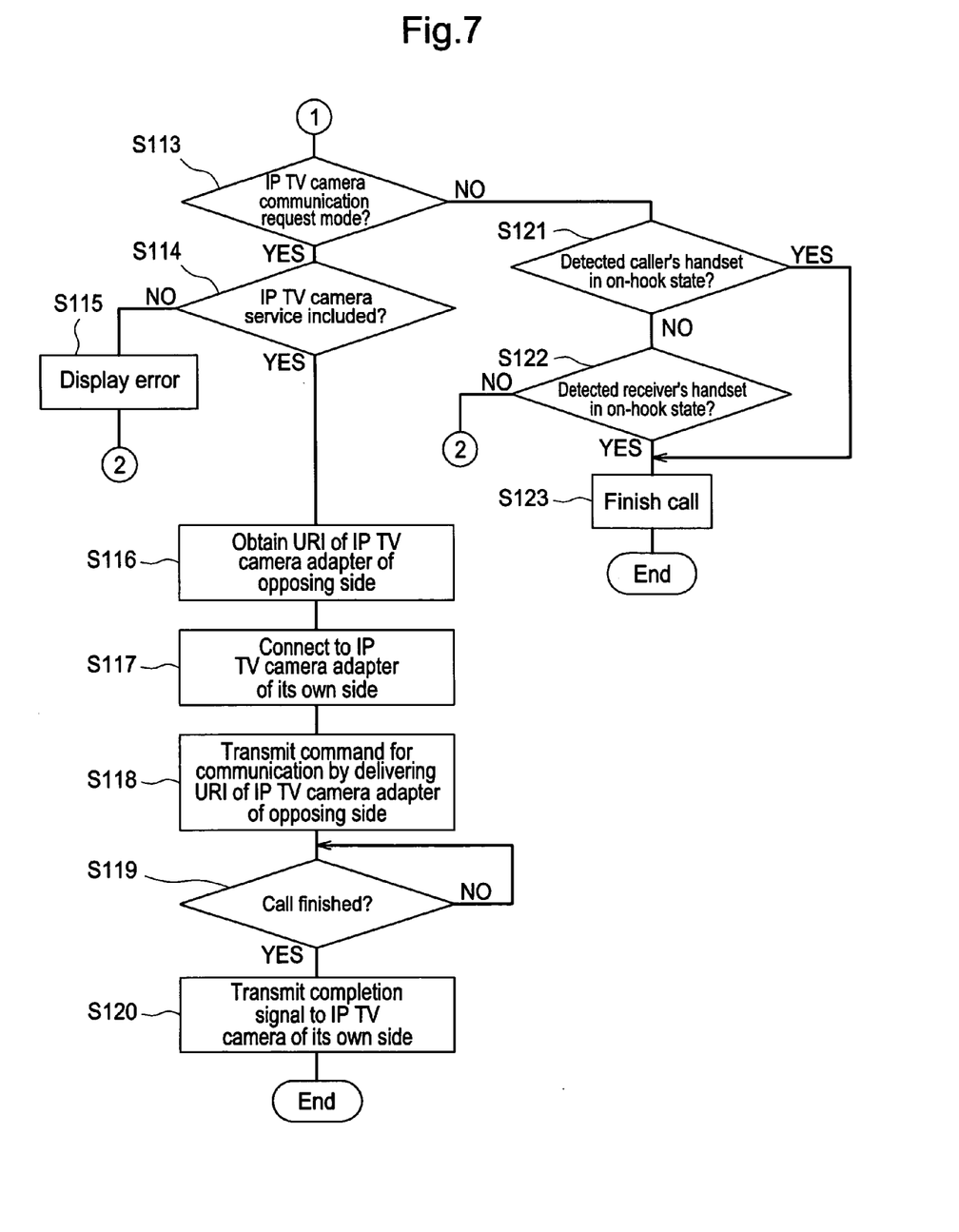
FIG. 7 is a flowchart illustrating the second half of the process generating and executing the call at the caller terminal.

FIGS. 6 and 7 are flowcharts illustrating a process at the caller terminal. The illustration uses IP telephone 100 as the caller terminal and IP telephone 110 as the receiver terminal, as shown in FIG. 2. When placing a call from IP telephone 100, the user removes handset 17 from the body of the apparatus and inputs the telephone number of receiver IP telephone 110 from operation panel 12.

When caller IP telephone 100 detects that handset 17 is in the off-hook state (S101) and recognizes that the telephone number is input (S102), the input telephone number is converted into a domain form so as to be searchable by the ENUM DNS (S103). For example, when the telephone number of receiver IP telephone 110 is "81-03-5434-5678", the domain-form telephone number is "8.7.6.5.4.3.4.5.3.1.8.e164.arpa". CPU 10 makes a request to DNS server 104 for a NAPTR resource record search using the domain-form telephone number as a key (S104). It is preferable that the address of DNS server 104 is pre-registered in caller IP telephone 100.

DNS server 104 searches the database using the specified domain-form telephone number as the key. When the receiver terminal has already registered the service in the NAPTR resource record of DNS server 104, the corresponding NAPTR resource record is retrieved and transmitted to the requester (caller IP telephone 100).

Upon receiving the NAPTR resource record from DNS server 104, caller IP telephone 100 recognizes that the NAPTR resource record exists (S105). Therefore, receiver IP telephone 110 obtains the service information registered in the NAPTR resource record of DNS server 104, and stores the information in the work area of RAM 19 (S106). For example, when receiver IP telephone 110 has registered 4 NAPTR resource records as shown in FIG. 4, such record contents are stored.

On the other hand, when the NAPTR resource record of DNS server 104 is not registered, an error process is performed, indicating that the record does not exist (S108). For example, "error" may be displayed on operation panel 12.

Next, CPU 10 analyzes the obtained NAPTR resource record and determines whether the IP telephone service is registered (S107). In case of obtaining the NAPTR resource records shown in FIG. 4, for example, the first NAPTR resource record service contents (36) describes <sip>, and URI (40) describes <iptel>. In this embodiment, it is recognized that service contents (36) describing <sip> and URI (40) including <iptel> indicate an IP telephone service.

Therefore, in this case, caller IP telephone 100 determines that the IP telephone service is available at receiver IP telephone 110. However, the URI information is not sufficient enough to determine what kinds of services are actually provided in the terminal, which is connected using the URI. Therefore, as an alternative configuration, when it is determined that the IP telephone service is not provided in the terminal, after connecting to the same using the URI, the caller terminal may connect to another URI included in the NAPTR resource record until it is connected to a terminal having the desired IP telephone service.

When none of the URIs included in the NAPTR resource records supports the IP telephone service, the control moves to step S108 to perform an error process. Instead of connecting to all of the URIs, when <sip> is not included in service content (36) in any of the NAPTR resource records, the control may directly move to the error process so as to save time for the error process.

Next, caller IP telephone 100 establishes a call to the receiver terminal via SIP server 105 (S109). The call connecting process according to the SIP may include the following steps. Caller IP telephone 100 first transmits an INVITE message to SIP server 105, the message including the information of receiver IP telephone 110. The information about receiver IP telephone 110 included in the INVITE message can be obtained from the NAPTR resource record stored at step S106. When using the NAPTR resource record in FIG. 4, SIP URI (iptel@ifax2.abc.com) is used as the destination information of receiver IP telephone 110, the information being described in the first NAPTR resource record that specifies the IP telephone service.

Upon receiving the INVITE message, SIP server 105 transmits the INVITE message to receiver IP telephone 110, requesting a connection. Receiver IP telephone 110's SIP URI (iptel@ifax2.abc.com) is used as the destination for the INVITE message.

Upon receiving the INVITE message (requesting the connection), receiver IP telephone 110 returns a message, to the caller terminal, allowing the connection via SIP server 105. Upon receiving the message allowing the connection, caller IP telephone 100 transmits an ACK message to receiver IP telephone 110 via SIP server 105. Upon receiving the ACK message from caller IP telephone 100, receiver IP telephone 110 returns "Ringing" (indicating a ringing status) to caller IP telephone 100 and transmits a sounding request to the handset.

Upon receiving "Ringing", caller IP telephone 100 sounds a ring tone from a speaker of handset 17. This ringing status continues until the receiver's handset 17 is taken off the hook (S110), or the caller's handset 17 is put back on the hook (S111). When the caller's handset 17 is put back on the hook, it indicates that the user at caller IP telephone 100 put handset 17 back to the apparatus. Therefore, the process is terminated.

When the user at receiver IP telephone 110 picks up handset 17 responding to the ringing phone to allow the operation at the terminal, receiver IP telephone 110 transmits an "OK" message to the caller terminal via SIP server 105, the message notifying that the voice call is now available. When the caller terminal returns an "ACK" message, the voice call is initiated.

When the caller and receiver terminals 100 and 110 are connected, both terminals perform direct communication without SIP server 105 (S112). The exchange of voice data is performed by the UDP using the RTP. Voice data input from the microphone of handset 17 is compressed by voice compression/expansion unit 15. CPU 10 transmits voice packets to Internet 103 via LAN 101, by inserting a task interruption every predetermined time period (e.g., every 20 msec). The IP header of the voice packet includes a sender IP address (caller terminal) and a destination IP address (receiver terminal). The RTP header sets time stamp information for controlling the order of the voice data.

The following illustrates the IP TV camera service in which a user having a voice call at caller IP telephone 100 enables a user at receiver IP telephone 110 to display a video image on TV 132 of the receiver terminal, the video image being generated by camera 121 of the caller terminal.

The user at caller IP telephone 100 presses the start button for starting the IP TV camera service, button being located in the operation panel 12. The start button can be a switch button specially designated for the IP TV camera service, or the button can be a soft button displayed on the display.

When CPU 10 of caller IP telephone 100 detects that the start button for the IP TV camera service is pressed during an IP telephone, CPU 10 recognizes that the IP TV camera communication request has been made (S113). When handset 17 of the caller terminal is put back on the hook, without the start button for IP TV camera communication being pressed during the IP call (S121), or when handset 17 of the receiver terminal is put back on the hook (S122), the voice call is terminated (S123).

Upon detecting the IP TV camera communication request, CPU 10 of the caller terminal determines whether receiver IP telephone 110 (with which the voice call is performed) supports the IP TV camera service (S114). Therefore, CPU 10 retrieves the NAPTR resource record (obtained at step S106) from a predetermined address stored in RAM 19, in order to check whether the IP TV camera service is included in any of the NAPTR resource records.

In this embodiment, when service contents (36) in the NAPTR resource record describes <sip>, and URI (40) includes a character codes <ipTVcamera>, it is recognized that the terminal having the URI supports the IP TV camera service.

Similar to the case of the IP telephone service described above, the URI information is not sufficient enough to determine what kinds of services are actually provided in the terminal, which is connected using the URI. Therefore, as an alternative configuration, when it is determined that the IP TV camera service is not provided in the terminal, after connecting to the same using the URI, the caller terminal may connect to another URI included in the NAPTR resource record until it is connected to a terminal having the desired IP TV camera service.

In the current IETF regulation, "SIP" is the only real-time communication service. Therefore, for specifying a real-time communication service including an IP telephone service and an IP TV camera service, <sip> is described in service content (36) of the NAPTR resource record. Therefore, the present embodiment checks up to URI (40) to determine whether the service content is IP telephone service or IP TV camera service. However, when a regulator such as IETF sets a regulation in the future, providing a specific character code description of the IP TV camera service, instead of <sip>, in service content (36) of the NAPTR resource record, the determination (of whether the IP TV camera service is supported) can be made by recognizing such a character code.

When none of the URIs included in the NAPTR resource records supports the IP TV camera service, the control moves to step S115 to perform an error process. Instead of connecting to all of the URIs, when <sip> is not included in service content (36) in any of the NAPTR resource records, the control may directly move to the error process so as to save time for the error process.

Next, CPU 10 of caller IP telephone 100 obtains the URI of IP TV camera adaptor 133 (of the receiver terminal), which is an adaptor connected to camera 131 and TV 132 (S116). In the example shown in FIG. 4, CPU 10 obtains the SIP URI (ipTVcamera@ipTVcameara.abc.com) included in the fourth NAPTR resource record.

Further, caller IP telephone 100 connects to caller IP TV camera adaptor 123 via LAN 101 (S117). The connection to the IP TV camera adaptor 123 is performed by using an IP address of IP TV camera adaptor 123 (of the caller), which is stored, in advance, in caller IP telephone 100. Then, IP telephone 100 gives the URI of the IP TV camera adaptor 133 (the adaptor of the receiver's camera 131 and TV 132) to IP TV camera adaptor 123 in order to start the video communication between IP TV camera adaptors 123 and 133 (adaptor 133 having the desired URI) (S118).

Figure 8:
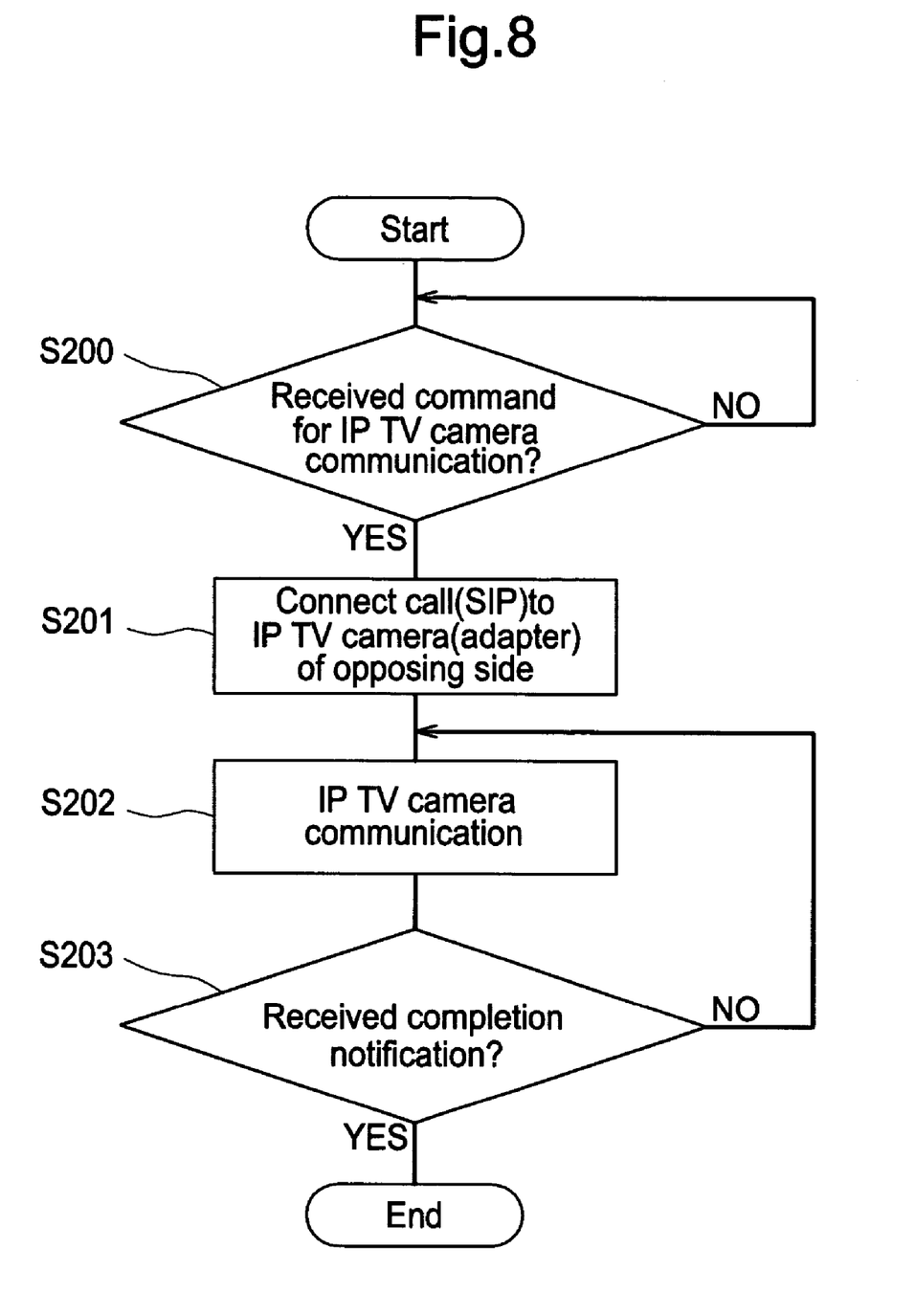
FIG. 8 is a flowchart of the IP TV camera adaptor.

FIG. 8 is a flowchart of one IP TV camera adaptor 123. IP TV camera adaptor receives a command for the IP TV camera communication when the URI of the opposing IP TV camera adaptor 133 is specified by IP telephone 100 (S200). IP TV camera adaptor 123 connects a call to the opposing IP TV camera adaptor 133 via SIP server 105 (S201). After the call connection is made, the video images being generated by both cameras 121 and 131 are exchanged by adaptors 123 and 133 (S202). The IP packets exchanged between adapters 123 and 133 have an IP address of adaptor 123 or 133 as the destination IP address in the IP header. Also, similar to the case of the VoIP, RTP header is added to the image data instead of the voice data.

When camera 121 is turned on at the caller side, the video image generated by camera 121 is input to the corresponding IP TV camera adaptor 123 as a video signal. IP TV camera adaptor 123 captures the video signal from TV camera interface 143. The video image encoder and decoder 145 encodes and compresses the video data. Then, CPU 140 generates an IP packet including the encoded video image data. The header of the IP packet includes an IP address of the opposing IP TV camera adaptor 133 as a destination IP address. The IP address of the opposing IP TV camera adaptor 133 is obtained by specifying the domain name of the URI from DNS server 104. However, the IP address can be obtained and used when connecting the call according to the SIP. The IP packet including the video image generated by a camera 121 is transmitted to the Internet 103 from LAN controller 146, via LAN 101 and router 102.

The IP packets transmitted to the Internet 103 by the IP TV camera adaptor 123 is routed into LAN 111 by router 112 and retrieved by IP TV camera adaptor 133.

IP TV camera adaptor 133 retrieves the video data from the IP packets (captured by LAN controller 146) and decodes the data using video image encoder and decoder 145. The decoded video data is then provided to a video image input terminal of TV 132 as the video signal. Therefore, the video image generated by the caller terminal camera 121 is displayed in real-time on TV 132 at the receiver terminal.

Similarly, the video image generated by a camera 131 of IP telephone 110 is displayed on TV 122 via opposing IP TV camera adaptor 123.

As shown in FIG. 7, when IP telephone 100 detects the on hook status of handset 17 of the receiver terminal or the caller terminal, IP telephone 100 determines the call is terminated (S119) and transmits a completion notification to its own IP TV camera adaptor 123 via LAN (S120).

As shown in FIG. 8, upon receiving the completion notification from IP telephone 100 (S203), IP TV camera adaptor 123 terminates the IP TV camera communication.

Accordingly, when IP telephone 100 gives the URI of the opposing IP TV camera adaptor 133 to its own IP TV camera adaptor 123 and requests the connection, the IP TV camera adaptor 123 and IP TV camera adaptor 133 autonomously establish a mutual connection and exchange video data. Therefore, it is possible for both sides to display video images of the opposing side, in real-time, during the voice call using the IP telephone.

In the above-described description, when caller IP telephone 100 receives an input of TV camera connection request, caller IP TV camera adaptor 123 makes a call connection request to receiver IP TV camera adaptor 133. However, the present invention is not limited to the above example. Similar connection can be made, conversely, when receiver IP telephone 110 receives an input for the TV camera connection request. In particular, when a TV camera connection request is input to IP telephone 110, the telephone number of IP telephone 100 is converted into a domain-form, in order to obtain a NAPTR resource record corresponding to the telephone number from DNS server 104. Then, it is determined whether the opposing side (caller side) supports the IP TV camera service. When supported, a URI of the IP TV camera service (URI for IP TV camera adaptor 123) is obtained so that the IP TV camera adaptor 133 can connect a call to IP TV camera adaptor 123 according to the SIP.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

This application is based on the Japanese Patent Application No. 2004-103927 filed on Mar. 31, 2004, entire content of which is expressly incorporated by reference herein.

What is claimed is:

1. An IP telephone, comprising:
an interface configured to be connected to an ENUM (Telephone Number Mapping) server and to an IP adaptor via a network, the IP adaptor being arranged in the same LAN as the IP telephone, the ENUM server storing a NAPTR (Naming Authority Pointer) resource record associated with a domain formed telephone number of a destination IP telephone, the NAPTR resource record including a URI (Uniform Resource Identifier), the IP adaptor being connected to a camera and to a display, the camera capturing an image of a user of the IP telephone, the display displaying an image of a user of the destination IP telephone;

an input device configured to input a telephone number of the destination and to instruct starting of an IP TV camera service; and a controller configured to:
   transform the input telephone number into the domain formed telephone number;
   obtain, from the ENUM server, the NAPTR resource record associated with the domain formed telephone number;
   perform a voice communication with the destination IP telephone via the network;
   detect an instruction to start the IP TV camera service during the voice communication; and
   transmit, to the IP adaptor, the URI included in the obtained NAPTR resource record and a request for a video communication with an IP adaptor of the destination IP telephone, when the controller detects the instruction to start the IP TV camera service during the voice communication, the IP adaptor connects with the IP adaptor of the destination IP telephone by calling the destination IP telephone using the URI, encodes the image captured by the camera and transmits the encoded image to the IP adaptor of the destination IP telephone, decodes the image received from the IP adaptor of the destination IP telephone and displays the decoded image on the display.

2. The IP telephone according to claim 1, wherein a controller obtains, from the ENUM server, a plurality of NAPTR resource records associated with the domain formed telephone number of the destination IP telephone.

3. The IP telephone according to claim 2, wherein, when the voice communication is performed, the controller searches for the NAPTR resource record including the URI for the voice communication, from the plurality of the obtained NAPTR resource records.

4. The IP telephone according to claim 2, wherein, when the request for the video communication is transmitted to the IP adaptor, the controller searches for the NAPTR resource record including the URI for the video communication, from the plurality of the obtained NAPTR resource records.

5. The IP telephone according to claim 1, wherein during the voice communication with the destination IP telephone, the controller transmits, to the IP adaptor, the URI included in the obtained NAPTR resource record and the request for the video communication with a IP adaptor of the destination IP telephone.

6. An IP adaptor, comprising:
   a first interface configured to be connected to a IP telephone, the IP telephone performing a voice communication with a destination IP telephone, the IP telephone being connected to an ENUM (Telephone Number Mapping) server, the ENUM server storing a NAPTR (Naming Authority Pointer) resource record associated with a domain formed telephone number of the destination IP telephone, the NAPTR resource record including a URI (Uniform Resource Identifier), the IP telephone obtaining, from the ENUM server, the NAPTR resource record associated with the domain formed telephone number of the destination IP telephone;
   a second interface configured to be connected to a camera and to a display, the camera capturing an image of a user of the IP telephone, the display displaying an image of a user of the destination IP telephone;
   a video image encoder and decoder configured to encode and decode the image; and
   a controller configured to:
      receive, from the IP telephone, the URI included in the NAPTR resource record and a request for a video communication with an IP adaptor of the destination IP telephone;
      connect with the IP adapter of the destination IP telephone by calling the destination IP telephone using the received URL;
      perform the video communication with the IP adaptor of the destination IP telephone using the URI;
      transmit, to the IP adaptor of the destination IP telephone, the image encoded by the video image encoder and decoder, the image captured by the camera; and
      display, on the display, the image decoded by the video image encoder and decoder, the image received from the IP adaptor of the destination IP telephone.

7. A method for making a call using an IP telephone, the IP telephone being connected to an ENUM (Telephone Number Mapping) server and to an IP adaptor via a network, the IP adaptor being arranged in the same LAN as the IP telephone, the ENUM server storing a NAPTR (Naming Authority Pointer) resource record associated with a domain formed telephone number of a destination IP telephone, the NAPTR resource record including a URI (Uniform Resource Identifier), the IP adaptor being connected to a camera and to a display, the camera capturing an image of a user of the IP telephone, the display displaying an image of a user of the destination IP telephone, the call method comprising:
   inputting, at the IP telephone, a telephone number of the destination and an instruction to start an IP TV camera service;
   transforming, at the IP telephone, the input telephone number into the domain formed telephone number;
   obtaining, from the ENUM server, the NAPTR resource record associated with the domain formed telephone number;
   performing, at the IP telephone, a voice communication with the destination IP telephone via the network;
   detecting an instruction to start the IP TV camera service during the voice communication;
   transmitting, from the IP telephone to the IP adaptor, the URI included in the obtained NAPTR resource record and a request for a video communication with an IP adaptor of the destination IP telephone when the instruction for starting the IP TV camera service during the voice communication is detected;
   connecting, with the IP adaptor of the destination IP telephone by calling the destination IP telephone using the URI; and
   encoding the image captured by the camera and transmitting the encoded image to the IP adapter of the destination IP telephone, decoding the image received from the IP adaptor of the destination IP telephone, and displaying the decoded image on the display.

* * * * *